Dec. 16, 1952 — P. E. SLAUGHTER — 2,621,384
PIPE CLAMP

Filed Nov. 5, 1951 — 3 Sheets-Sheet 1

Philip E. Slaughter
INVENTOR.

BY
K. Weil
ATTORNEY

Dec. 16, 1952     P. E. SLAUGHTER     2,621,384
PIPE CLAMP
Filed Nov. 5, 1951     3 Sheets-Sheet 2
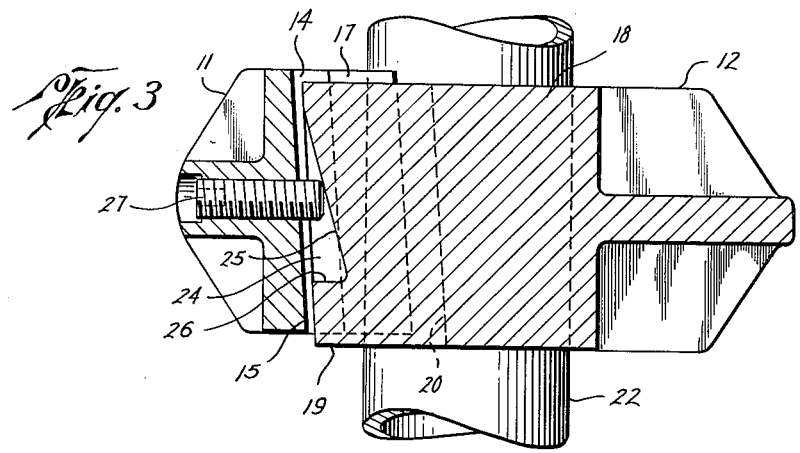
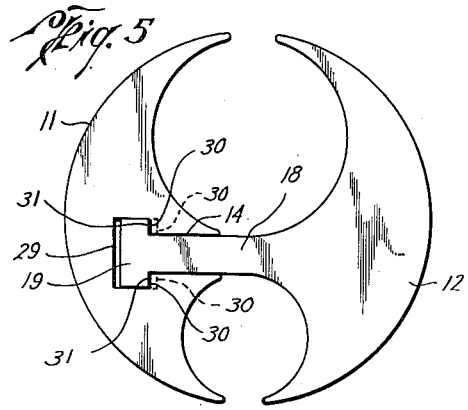
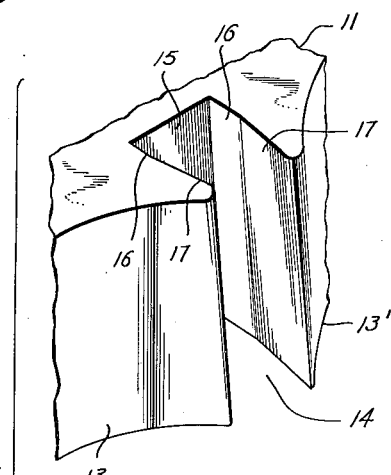
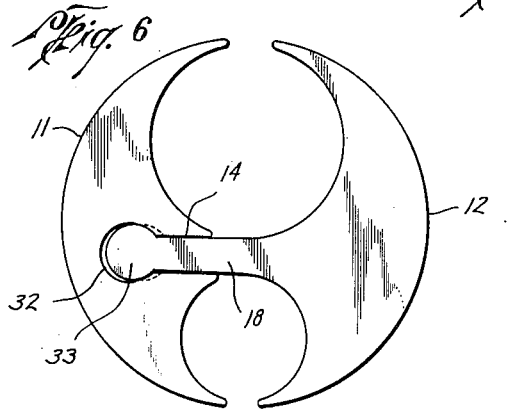
INVENTOR.
Philip E. Slaughter
BY
ATTORNEY Dec. 16, 1952 P. E. SLAUGHTER 2,621,384
PIPE CLAMP
Filed Nov. 5, 1951 3 Sheets-Sheet 3
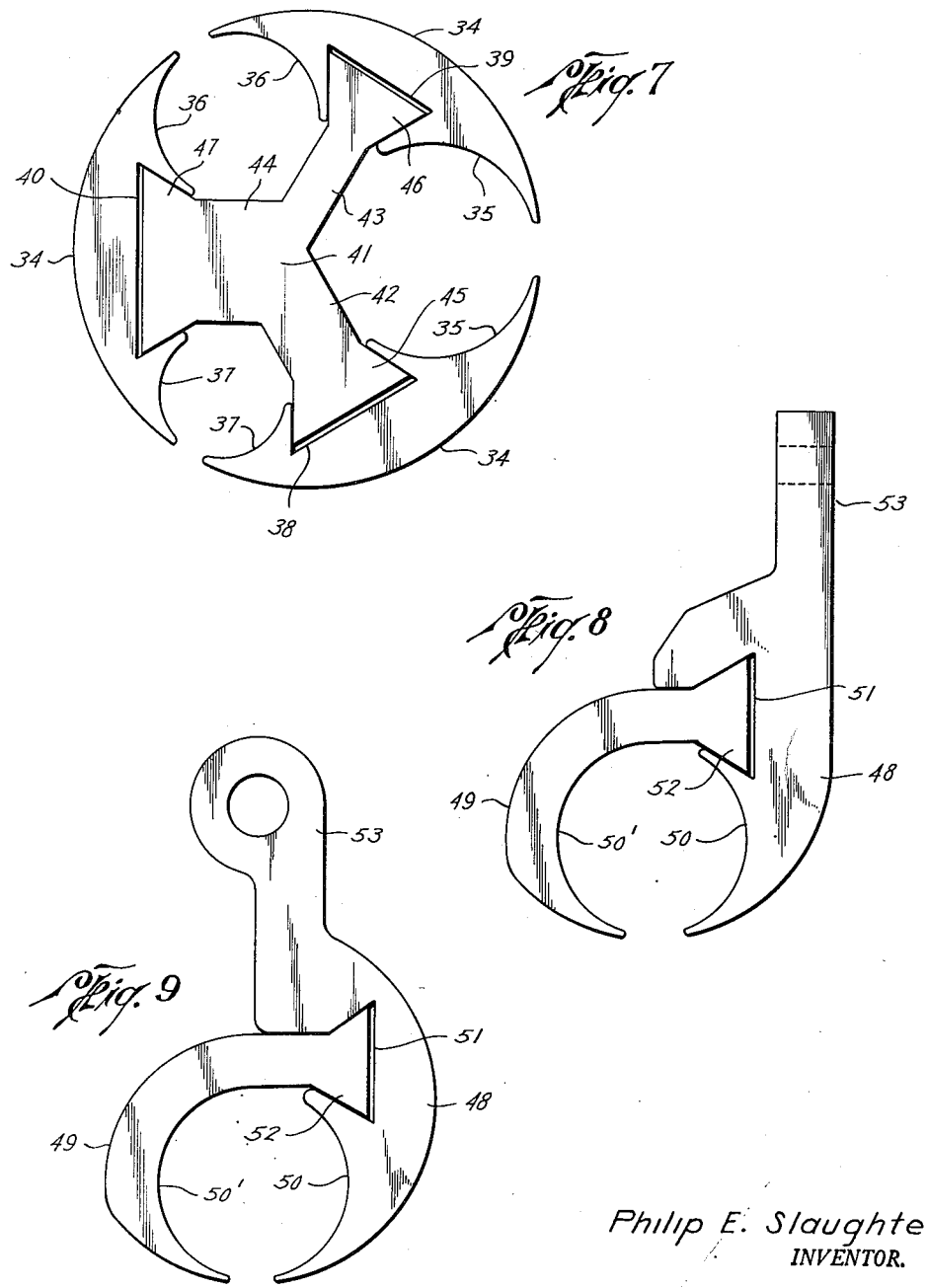
Philip E. Slaughter
INVENTOR.
BY
ATTORNEY Patented Dec. 16, 1952

2,621,384

UNITED STATES PATENT OFFICE 2,621,384

PIPE CLAMP

Philip E. Slaughter, Houston, Tex., assignor to
Cicero C. Brown, Houston, Tex.

Application November 5, 1951, Serial No. 254,840

10 Claims. (Cl. 24—81)

This invention relates to pipe clamps for supporting pipe strings and particularly to pipe clamps which are adapted to connect together two or more parallel strings of pipe to render said pipe strings mutually supporting.

In numerous piping installations, particularly where two or more strings of pipe are employed for conducting various fluids, it is generally desirable or necessary, for reasons of space limitations, design considerations, etc., to arrange the strings of pipe in groups or parallel courses. Where the strings are of substantial length it is usually necessary to suitably support the pipes at intervals along their length to prevent sagging or bending, vibration or other undesirable movement of the pipe strings.

The present invention is directed to an improved form of supporting clamp which may be used for supporting pipes in various types of piping installations.

The clamp in accordance with the present invention is particularly adapted for use in pipe installations in which two or more long strings of pipe are disposed in vertical, parallel relation and are to be inserted in a surrounding pipe or casing of relatively limited diameter. Such an installation is often employed in the operation of an oil well in which it is desired to use the well known oil or gas lift process for flowing the well fluids to the surface. Such operations normally require a string of tubing to be inserted in the well bore through which the oil or other well fluid is conducted to the surface, and a second, and generally smaller diameter, pipe string which extends into the well bore alongside the tubing string for the purpose of conducting gas or air into the well to aid in lifting or propelling the oil or well fluid to the surface through the tubing string. It will be understood that the well bore will ordinarily be lined with a casing which is necessarily of relatively limited diameter and, therefore, restricts the space into which the pipe strings may be inserted in their side-by-side relation. These inserted strings are ordinarily of great length and will tend to sag, bend or separate and will thus create considerable difficulty in their installation and withdrawal.

The clamp in accordance with one embodiment of the present invention is constructed in the form of a body composed of at least two segments having pipe surrounding portions which are adapted to be applied to opposite sides of the adjacent pipes and to be joined together and clamped about the pipes by means of relatively simple connection elements which are engageable by relative longitudinal sliding movement of the segments toward each other along the pipes, the connection elements being so formed and designed that the relative longitudinal movement will also produce relative radial movement of the segments so as to cause the pipe-gripping portions of the segments to tightly grip both pipes. With such a clamp the pipe strings are rendered mutually supporting and will be maintained in the desired close parallel relationship.

The clamp may be provided with releasable locking means to prevent separation of the segments after they have been applied to the pipes.

The various objects and advantages of this invention will become apparent from the following detailed description when read in conjunction with the accompanying drawings which illustrate several useful embodiments in accordance with this invention.

In the drawings:

Fig. 3 is a longitudinal sectional view of the clamp taken along line 3—3 of Fig. 2;

Fig. 4 is an exploded view in perspective of the tongue-and-slot connection between the clamp segments;

Figs. 5 and 6 are simplified plan views of additional embodiments for connecting together two strings of pipe;

Fig. 7 is a simplified plan view of an embodiment for connecting together three strings of pipe; and Figs. 8 and 9 are side elevations of forms of pipe hangers employing the clamp construction in accordance with this invention.

Figure 1:
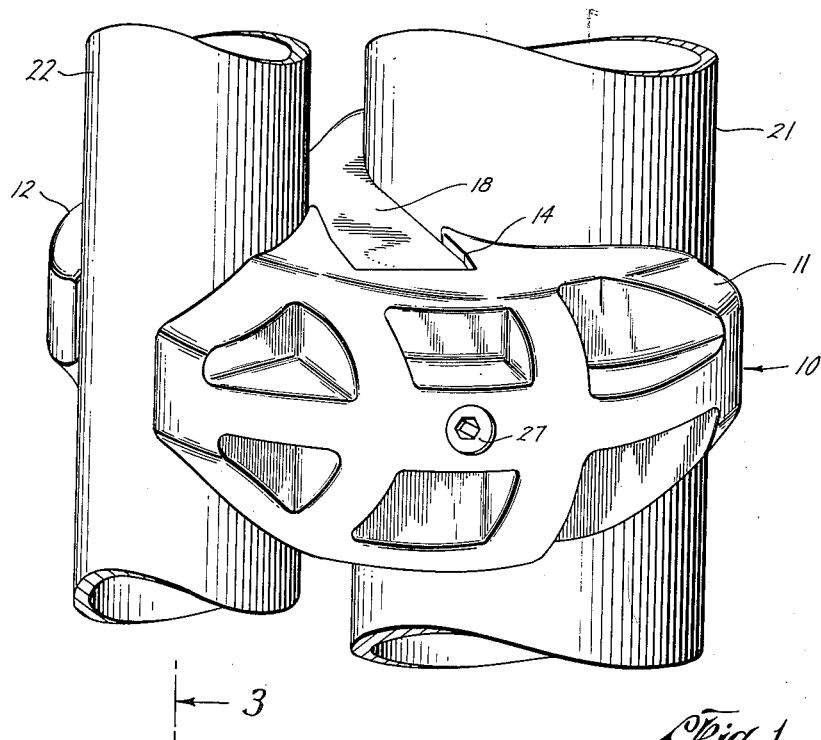
Fig. 1 is a perspective view showing the clamp in accordance with one embodiment of this invention for connecting a pair of parallel pipes of different diameters.
Figure 2:
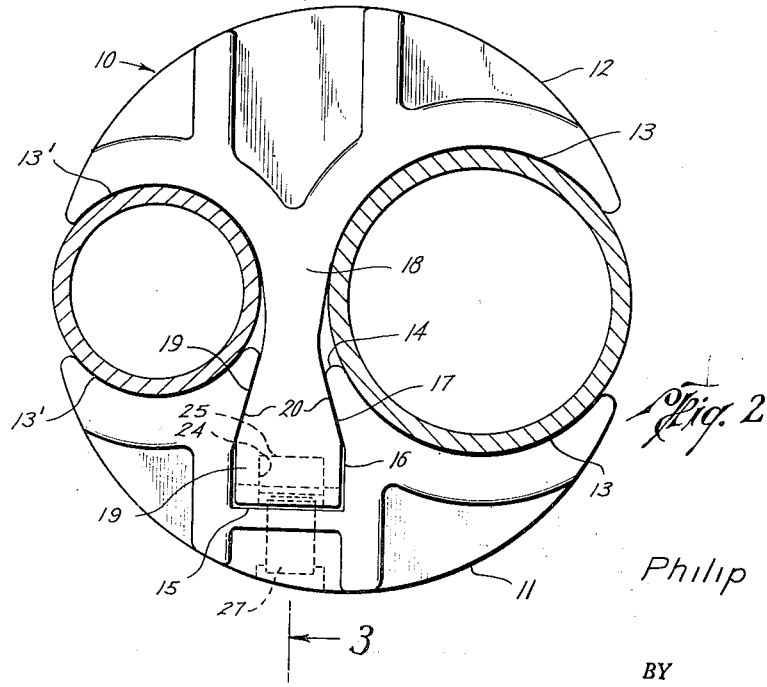
Fig. 2 is a transverse cross-sectional view of the clamp shown in Fig. 1.

Referring to the drawings, the embodiment illustrated in Figs. 1 to 4, comprises a body, designated generally by the numeral 10, which is generally circular in shape and constructed preferably of a strong metal such as steel and the like. As best seen in Fig. 2, body 10 is composed of two complementary arcuate segments 11 and 12, each of which encompasses somewhat less than 180° so that when the segments are connected together intermediate their ends, the opposing outer ends of the segments will be spaced somewhat apart, as shown. The segments are provided at each end with complementary pairs of arcuate recesses 13—13 and $13^1$—$13^1$, the opposing pairs of arcuate recesses at each end defining segments of a circle having a nominal radius corresponding to the external radius of the pipe to be enclosed thereby, and defining between them an arc greater than 180°. In the embodiment illustrated in Figs. 1 to 4, the clamp is designed to connect two parallel pipes of different external diameters and the radii for the arcuate recesses will be correspondingly different.

The inner wall of segment 11 is provided at a point intermediate its recesses 13 and 13¹ with a slot 14 extending longitudinally from end to end of the segment and closed by a rear wall 15. In this embodiment, slot 14 is of a dove-tail form wherein the sides of the slot taper inwardly toward its open end from a portion 16 of maximum width at the rear of the slot. The tapering sides of slot 14 thus form internal shoulders 17—17 extending longitudinally of the slot, and also generally tangentially to the arcs of the adjacent recesses 13 and 13¹.

Segment 12 is provided with an integrally formed tenon or tongue 18 disposed between its arcuate recesses 13 and 13¹ and which extends from the inner wall of this segment toward slot 14. The opposite sides of tongue 18 merge smoothly with the adjacent recesses and form tangential extensions thereof. Near its outer end, tongue 18 is provided with an enlargement 19 shaped and dimensioned to fit snugly, and slide longitudinally, in slot 14, being provided with diverging side portions connecting tongue 18 to enlargement 19 and forming external shoulders 20—20 extending longitudinally along each side of tongue 18 and adapted to engage internal shoulders 17—17 in slot 14 whereby to lock tongue 18 in slot 14 when tongue 18 has been inserted longitudinally in slot 14.

Internal shoulders 17—17 in slot 14 and external shoulders 20—20 of tongue 18 are both inclined at a small angle to the longitudinal axis of the clamp, as best seen in Fig. 3. This inclination of the pairs of engaging shoulders is an important feature of the present invention, as will be more fully described hereinafter.

As seen in Fig. 3, rear wall 15 and the adjacent end face of enlargement 19 are illustrated as also being inclined at an angle to the longitudinal axis of the clamp but it should be understood that this is not essential as these surfaces do not normally engage and may be made parallel to the longitudinal axis of the clamp without affecting the operation of the clamp.

The above described clamp is employed to connect a pair of parallel pipes, such as pipes 21 and 22, in the following manner. Segment 12 will be placed against one side of the pair of pipes with tongue 18 extending between the pipes, the pipes being snugly seated in recesses 13 and 13¹ in this segment, and tongue 18 forming a spacer between the pipes. Segment 11 will then be placed against the opposite sides of the pair of pipes with the open end of slot 14 in registration with tongue 18, the pipes being snugly seated in recesses 13 and 13¹ of segment 11. The arcuate length of the complementary pairs of recesses 13—13 and 13¹—13¹ will normally be such as to define an arc greater than 180° and thus surround more than one half of each pipe. Initially, segment 11 will be longitudinally spaced from segment 12 along the pipes. One of the segments, usually segment 11, will then be moved longitudinally toward the other so as to cause enlargement 19 on tongue 18 to enter slot 14 and slide longitudinally therein as the segments are moved longitudinally toward each other. The entry of enlargement 19 into slot 14 will bring the respective shoulders 20—20 and 17—17 into longitudinal sliding engagement and the above-described inclination of these shoulders will produce radial movement of the segments toward each other thereby closing the recessed portions 13—13¹ of the segments ever more tightly about pipes 21 and 22 as the clamp-segments are forced together longitudinally. The segments may be driven home by hammer blows or the like in order to assure the desired degree of tightness of the clamp about the pipes. The clamp may, of course, be released from the pipe by forcing segments 11 and 12 apart longitudinally which will correspondingly retract the segments from their engagement with the pipes.

Auxiliary locking means may be employed to hold the segments in their clamping position if desired. One suitable form of such an auxiliary locking means is shown in Figs. 1 to 4. For this purpose, the outer end face of enlargement 19 is provided with an elongated slot 24 having an inner wall 25 tapering inwardly from the end face and downwardly to a point somewhat above the lower end of tongue 18, and terminating at a bottom wall 26. The angle of taper of wall 25 will be made somewhat greater than that of shoulders 17 and 20. A set screw 27 extends radially through the wall of segment 11 into registration with slot 24. When the clamp segments have been joined and set to the desired degree of tightness about the pipes, set screw 27 will be screwed through segment 11 until it projects into slot 24 and engages tapered wall 25. It will be seen that any tendency of the segments to separate in the upward or loosening direction will be resisted by the engagement of the end of set screw 27 with the tapered surface of wall 25. Any movement of the segments in the opposite direction will, of course, tend to tighten the clamps about the pipes.

With the construction described, particularly by reason of the inclination of the engaging pairs of dove-tail shoulders 17—17 and 20—20, it will be seen that the respective circles formed by the pair of recesses 13—13 and 13¹—13¹ will be respectively contracted and expanded as tongue 18 is moved longitudinally in and out of slot 14, the radii of the circles ranging from slightly larger than the external radii of the pipes at one extreme to slightly smaller than the external radii of the pipes at the other extreme, and the difference in radii being determined by the angle of inclination of shoulders 17—17 and 20—20. This angle of inclination may be varied and will usually be determined by the axial length of the clamp, and will ordinarily vary inversely with the length of the clamp, that is, the shorter the clamp the greater the angle and vice-versa. The diameters of the pipes to be clamped do not control the angle selected. Generally, for a clamp of given length, the angle selected will be one which will produce that degree of radial contraction of the circles formed by the pairs of recesses necessary to tightly grip the pipes when the segments have been moved longitudinally to substantially their fully engaged positions, that is, at which the upper and lower ends of the segments will be in substantially flush position. In this way, the clamping or wedging load will be distributed through the maximum area of the engaging surfaces of the segments and thereby reduce danger of breakage of the clamps to a minimum.

Generally, for most practical clamp sizes, the angle of inclination of shoulders 17—17 and 20—20 will be selected in a range from about 2° to 30° with respect to the longitudinal axis of the clamp. By way of example, for a clamp 2 inches in length, the angle of inclination selected for shoulders 17—17 and 20—20 will be 6½°.

It will be evident that the above-described clamp construction will form a rigid connection between a pair of pipes and by employing a number of such clamps suitably spaced along a pair of parallel pipe strings, the pipes will be maintained in close parallel relation and will be mutually supporting. It will be seen that the clamp, in accordance with this invention, is relatively simple in construction, is composed of a minimum number of parts and may be applied and removed with a minimum of effort.

Fig. 5 illustrates a construction very similar to that shown in Figs. 1 to 4, differing only in that the inner end portion 29 of slot 14 is T-shaped in cross-section forming internal rearwardly facing shoulders 30—30 which extend at right angles to the length of the slot and enlargement 19 on tongue 18 is of complementary shape being in T form and having forwardly facing external shoulders 31—31 extending at right angles to its length and engageable with internal shoulders 30—30. It will be understood that these pairs of shoulders will also be longitudinally inclined at a suitable angle to the longitudinal axis of the clamp.

Fig. 6 illustrates another modification in which the inner portion 32 of slot 14 and the complementary enlargement 33 on the end of tongue 18 are generally cylindrical in transverse section. These engaging portions of the tongue and slot will also be inclined to the vertical axis of the clamp as in the previously described embodiment.

The operation of the modifications illustrated by Figs. 5 and 6 will be identical in all respects with that described in connection with the embodiment illustrated by Figs. 1 to 4.

Fig. 7 illustrates a clamp constructed in accordance with the principles of this invention and adapted for connecting together three pipes of different diameters. In this embodiment three segments 34—34—34 corresponding in form and function generally to segment 11 of the previous embodiment are employed, each encompassing an arc of about 120°. The adjacent ends of each pair of segments 34 are provided with complementary arcuate recesses 35—35, 36—36, and 37—37 for enclosing the respective pipes and each is provided with a dove-tail slot 38, 39, and 40, respectively. A single segment 41 is formed to provide three radial tongues 42, 43, and 44 extending therefrom at angles 120° apart, and is employed to connect with all three segments 34, the ends of the tongues being provided with respective dove-tail enlargements 45, 46, and 47 slidably insertible in the respective slots 38, 39, and 40. It will be understood that the engaging surfaces of the slots and enlargements will all be inclined at a suitable angle to the longitudinal axis of the clamp. In assembling this form of clamp it will be obvious that segment 41 will first be positioned between the pipes and then the several segments 34 will be applied about the exterior of the pipes.

Figs. 8 and 9 illustrate modification in which the clamp may be employed as a pipe hanger for supoprting a single string of pipe from a wall (Fig. 8) or from an overhead support (Fig. 9). Each of these modifications is composed of a pair of segments 48 and 49, each of the segments being provided with only a single arcuate recess 50 and 50¹, respectively, adapted to enclose a single pipe. Segment 48 is provided with a dove-tail slot 51 and segment 49 with a complementary tongue 52 corresponding in form and function to the same elements in the previous embodiments. Each of the segments 48 is provided with an ear 53 of suitable shape for attaching the clamp to a suitable supporting structure. In these modifications segment 48 will usually first be attached to the supporting structure and the pipe to be supported will be laid in recess 50. Then segment 49 will be applied to the opposite side of the pipe and connected to segment 48 by sliding tongue 52 into slot 51.

It will be understood the various additional modifications and changes may be made in the details of the construction of the clamps in accordance with this invention within the scope of the appended claims but without departing from the spirit of this invention.

What I claim and desire to secure by Letters Patent is:

1. A pipe clamp, comprising, a generally annular body composed of a pair of complementary arcuate segments adapted to surround a pipe, a slidably engageable tongue-and-slot connection between said segments at one side of said body and extending generally longitudinally thereof, said tongue-and-slot having radially abuttable shoulder means extending generally longitudinally along the adjacent sides thereof and at an angle to the longitudinal axis of said body.

2. A pipe clamp according to claim 1 wherein said angle is within the range of from about 2° to about 30°.

3. A pipe clamp according to claim 1 wherein said tongue-and-slot connection is of the dove-tail form.

4. A pipe clamp according to claim 1 having auxiliary locking means extending between the segments for releasably locking said segments against longitudinal separation thereof.

5. A pipe clamp, comprising, a generally annular body composed of a pair of complementary segments, complementary arcuate recesses in the inner faces of said segments adapted to surround a pipe, cooperating tongue-and-slot elements formed on the respective segments and extending generally longitudinally of said body adjacent one side of said recesses and adapted to form a longitudinally slidable connection between said segments, and radially abutting shoulder means on the adjacent sides of said tongue-and-slot elements extending generally longitudinally thereof and at an angle to the longitudinal axis of said body.

6. A pipe clamp according to claim 5 wherein said angle is within the range of from about 2° to about 30°.

7. A pipe clamp, comprising, a body composed of a pair of complementary segments adapted to be disposed on opposite sides of a pair of parallel pipes, a pair of complementary arcuate recesses in the inner adjacent faces of said segments at each end thereof to separately receive said pipes, a generally longitudinal slot in the inner face of one of said segments intermediate said recesses, said slot having longitudinally extending internal shoulder means on opposite sides thereof, a tongue member extending from the inner face of the other segment intermediate said recesses for longitudinal sliding engagement in said slot, said tongue having external longitudinally extending shoulder means radially abuttable with the internal shoulders in said slot when said tongue is inserted therein, both sets of said shoulder means being inclined at an angle to the longitudinal axis of said body, whereby relative longitudinal movement of the engaged slot and tongue member will produce relative radial movement between said segments for radially expanding and contracting said recesses about said pipes.

8. A pipe clamp according to claim 7 wherein said angle is within the range of from about 2° to about 30°.

9. A pipe clamp according to claim 7 wherein said tongue member and said slot are of complementary dove-tail form.

10. A pipe clamp according to claim 8 having auxiliary locking means extending between the segments for releasably locking said segments against longitudinal separation thereof.

PHILIP E. SLAUGHTER.

No references cited.